US012425785B2

(12) United States Patent
Newton et al.

(10) Patent No.: US 12,425,785 B2
(45) Date of Patent: Sep. 23, 2025

(54) PERSONAL COMMUNICATION DEVICE

(71) Applicants: Victoria C. Newton, East Haddam, CT (US); Ralph T. Campagna, Pomfret Center, CT (US)

(72) Inventors: Victoria C. Newton, East Haddam, CT (US); Ralph T. Campagna, Pomfret Center, CT (US)

( * ) Notice: Subject to any disclaimer, the term of this patent is extended or adjusted under 35 U.S.C. 154(b) by 248 days.

(21) Appl. No.: 18/149,949

(22) Filed: Jan. 4, 2023

(65) Prior Publication Data

US 2023/0224651 A1 Jul. 13, 2023

Related U.S. Application Data

(60) Provisional application No. 63/361,603, filed on Jan. 10, 2022.

(51) Int. Cl.
*H04R 25/00* (2006.01)

(52) U.S. Cl.
CPC ......... *H04R 25/656* (2013.01); *H04R 25/505* (2013.01); *H04R 25/554* (2013.01); *H04R 25/602* (2013.01); *H04R 25/603* (2019.05); *H04R 25/606* (2013.01); *H04R 25/607* (2019.05); *H04R 25/609* (2019.05); *H04R 2225/0213* (2019.05); *H04R 2225/31* (2013.01); *H04R 2225/55* (2013.01); *H04R 2225/61* (2013.01); *H04R 2430/01* (2013.01); *H04R 2460/13* (2013.01)

(58) Field of Classification Search
CPC .. H04R 25/656; H04R 25/607; H04R 25/603; H04R 25/609; H04R 25/505; H04R 25/554; H04R 25/602; H04R 25/606; H04R 2225/0213; H04R 2225/31; H04R 2225/55; H04R 2225/61; H04R 2430/01; H04R 2460/13

See application file for complete search history.

(56) References Cited

U.S. PATENT DOCUMENTS

| | | | | |
|---|---|---|---|---|
| 2014/0098983 A1* | 4/2014 | Clow | H04R 1/10 | 381/381 |
| 2016/0134957 A1* | 5/2016 | Jentz | H04R 1/105 | 381/380 |
| 2016/0360326 A1* | 12/2016 | Bergmann | H04R 25/43 | |
| 2017/0318372 A1* | 11/2017 | Gerber | H04R 1/26 | |
| 2018/0332412 A1* | 11/2018 | Haagerup | H04R 25/606 | |
| 2020/0007997 A1* | 1/2020 | Kaufman | H04R 25/609 | |
| 2023/0164501 A1* | 5/2023 | Daley | H04R 25/65 | 381/324 |

* cited by examiner

*Primary Examiner* — Mark Fischer
(74) *Attorney, Agent, or Firm* — Steven M. McHugh; Halloran & Sage LLP

(57) ABSTRACT

A Personal Communication Device (PCD) is provided and includes a microphone, a speaker, and a PCD body, wherein the PCD body is configured as an ear cuff and includes a body first end, a body second end and a body middle portion. The PCD body further includes sound processing electronics, such that when a sound is received by the microphone, the sound processing electronics process the sound to generate a processed sound and communicates the processed sound to the speaker and outputs the processed sound into the user's ear canal, wherein the PCD is configured to be securely associated with an ear of a user such that when the PCD is associated with the ear of the user, and wherein the PCD is configured for wireless connectivity.

17 Claims, 22 Drawing Sheets

PERSONAL COMMUNICATION DEVICE

CROSS-REFERENCE TO RELATED APPLICATIONS

This application claims the benefit of priority of the filing date of U.S. Provisional Patent Application Ser. No.: 63/361,603, filed on Jan. 10, 2022, the contents of which are incorporated by reference herein in its entirety.

FIELD OF THE INVENTION

The present invention relates generally to a personal communication device, and more particularly to a personal sound receiving device configured as an ear cuff decoration article.

BACKGROUND OF THE INVENTION

Hearing aids are well known and are useful for a variety of pathologies, including sensorineural hearing loss, conductive hearing loss and single-sided deafness. Typically, hearing aid candidacy is determined by a licensed individual (such as an audiologist or hearing instrument specialist) who examines the patient to determine the type of hearing loss and fits the hearing aid device to the patient based on the nature and degree of the hearing loss. This is important because the amount of benefit experienced by the user of the hearing aid is multi-factorial, depending on the type, severity, and etiology of the hearing loss, the technology and fitting of the device, and on the motivation, personality, lifestyle, and overall health of the user. It should be appreciated that hearing aids are incapable of correcting hearing loss. Rather, they are used to make sounds more audible so that the sounds can reach the cochlea and auditory nerve, where the cochlea and auditory nerve are able to transmit signals to the brain normally.

Currently, there are many different devices to make sounds more audible to hearing loss patients and they range from body-worn devices to behind-the-ear devices to in-the-ear devices to devices that include a directional microphone. One such example is a personal sound amplification device which is a simple device that amplifies sound for a wearer. These devices are typically used for individuals that have some degree of hearing loss, but whose hearing loss is not severe enough for a hearing aid. The FDA has not approved these devices as a medical device and classifies these devices as wearable electronic products for occasional, recreational use by consumers who are not hearing impaired. Other examples include medical devices, or hearing aids, of which there are several different types. Referring to FIG. 1, some current styles of hearing aids are shown and include body worn hearing aids, eyeglass hearing aids, behind the ear (BTE) hearing aids—sometimes referred to as Over the Ear (OTE) hearing aids, receiver in the ear canal (RIC) hearing aids, in the canal (ITC) hearing aids and completely in the canal (CIC) hearing aids and earlobe hearing aids. Unfortunately, however, while these current devices do work, there are some deficiencies associated with each of these styles. For example, while the BTE and RIC styles are the most popular at 80%+ in the marketplace, the initial reaction to the look of the device may seem old fashioned to some consumers. Additionally, the ITE, ITC and CIC hearing aid styles create an occlusion effect and make the wearer's voice sound like it's in a barrel and give a 'plugged up' sensation and are typically best suited for moderate to severe hearing loss. This occlusion occurs when the hearing aid wearer's own voice is trapped in the ear canal by the hearing aid blocking the air canal. Another example includes power BTE style of hearing aids which include a larger electronic enclosure to house the receiving and processing electronics. The BTE style typically fits over the ear with an ear-mold or earplug located either at the entrance of, or in, the ear canal, wherein the electronics are located behind the ear. Unfortunately, however, these styles are relatively large, unattractive and more obvious to people who encounter the wearer.

SUMMARY OF THE INVENTION

A Personal Communication Device (PCD) is provided and includes a microphone, a speaker, and a PCD body, wherein the PCD body is configured as an ear cuff and includes a body first end, a body second end and a body middle portion, wherein the body first end is associated with the body second end via the body middle portion. The body first end includes a body structure which defines a component cavity for containing a power source, and sound processing electronics, and wherein the body second end includes the speaker and the microphone, and wherein the speaker and the microphone are communicated with the power source and the sound processing electronics, such that when a sound is received by the microphone, the sound processing electronics process the sound to generate a processed sound and communicates the processed sound to the speaker. Moreover, the PCD is configured to be securely associated with an ear of a user such that when the PCD is associated with the ear of the user, the speaker is located proximate an ear canal of the user and the body structure is located behind the user's ear and wherein the PCD is configured for wireless connectivity.

A Personal Communication Device (PCD) is provided and includes a microphone, a speaker, and a PCD body, wherein the PCD body is configured as an ear cuff and includes a body first end, a body second end and a body middle portion. The PCD body further includes sound processing electronics, such that when a sound is received by the microphone, the sound processing electronics process the sound to generate a processed sound and communicates the processed sound to the speaker and outputs the processed sound into the user's ear canal, wherein the PCD is configured to be securely associated with an ear of a user such that when the PCD is associated with the ear of the user, the speaker is located proximate an ear canal of the user and wherein the PCD is configured for wireless connectivity.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1:
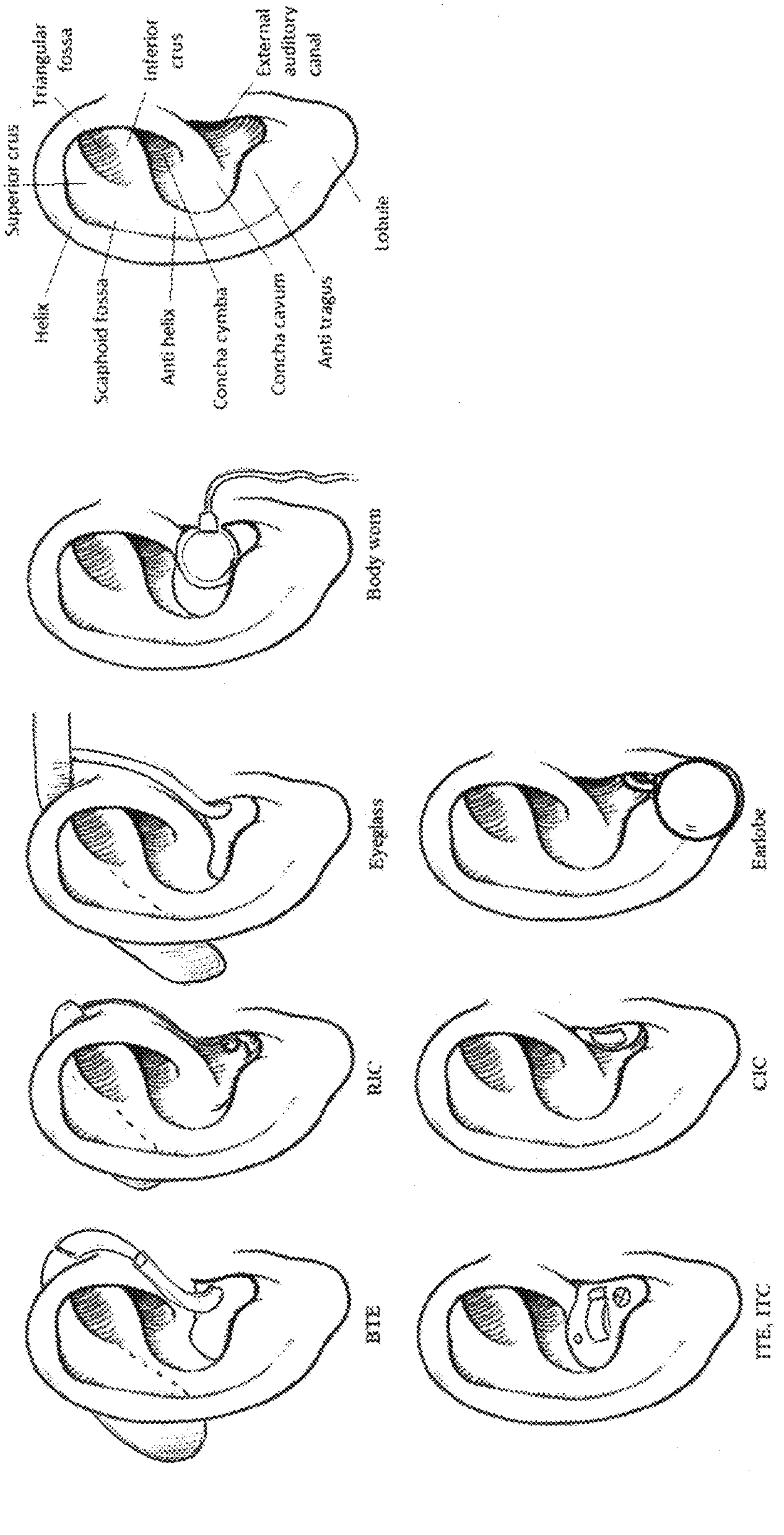
FIG. 1 Prior Art
FIG. 1 is a side view of a person's ear showing the current different styles of hearing aid devices, in accordance with the prior art.

In accordance with the present invention, a Personal Communication System (PCS) is provided and includes one or more Personal Communication Devices (PCD) 100 that are configured having a 'cuff' design to be worn as jewelry on the ear of a person. The cuff of the PCD 100 is configured to securely associate with the outer ear of the wearer by wrapping around the ear helix/antihelix such that one end of the cuff is proximately located behind the ear pinna and the other end of the cuff is proximately located within the ear concha cavum. The unique and novel design of the invention allows the speaker to be strategically located within the external auditory canal proximate the opening of the ear canal. This allows the speaker to be located close to the opening of the ear canal and for a direct path for any sound emanating from the speaker to flow into the opening of the ear canal. It should be appreciated that the cuff may define a cuff cavity which is configured to include the processing elements necessary to receive sound, process the received sound and deliver the received sound through wireless communication, an external speaker, a bone oscillator and/or a sound tube (and/or other delivery method as desired). It is contemplated that embodiments of the PCD 100 also may incorporate a unique and novel microphone system which allows the microphone to be located within the concha cymba to reduce wind noise and to create a gap between the speaker and the microphone which advantageously allows for localization of sound and for a reduction/elimination in feedback. Additionally, in other embodiments of the invention, the PCD 100 may include one or more microphones, wherein a microphone may be located in front of the pinna, behind the pinna and/or both. Moreover, among the many other advantages over the prior art, the unique and novel cuff design allows for the processing and power components to be naturally hidden from view and for a decorative cover to be attached to the PCD 100 via a variety of ways, such as via a mechanical clip, a magnetic clip, etc.

It should be appreciated that one of the unique and novel characteristics of the present invention is that the PCD 100 of the present invention provides a new and unique category of ear worn hearing devices due to the location on the ear that the PCD 100 is worn. The embodiments of the present invention provide a PCD 100 where the microphone is located in the concha cymba and the cuff of the PCD 100 is associated with at least one of the antihelix, scaphoid fossa, antihelical fold, antihelix tail, helix tail, and antihelix body.

It should be appreciated that jewelry covers may be used to decorate the PCD, wherein the covers may be able to be produced in unlimited designs that can help inspire the wearer to use them without the stigma of traditional hearing aid devices. Furthermore, it is contemplated that embodiments of the PCD also may be automatically and/or manually programmable and may incorporate an adjustment system (for example, in one embodiment a switch) which allows the PCD to adjust various features, such as the tone and/or volume of the sound based on user preference and/or via an algorithm. For example, in one embodiment, the PCD may include a processor with advanced noise reduction and may provide the wearer with the ability to set the sound characteristics to their personal preference with either a preference wand, a user control button, and/or via a smart phone app. Moreover, the PCD may be worn on a part time or as needed basis, for example, restaurants, business meetings, theater, social events, etc. It is further contemplated that the PCS may include one or more PCDs depending upon the needs of the wearer, wherein each of the PCDs may be separately programmable. For example, for a person that has hearing loss in only one ear, then only one PCD may be required for the deficient ear, while a 'dummy' earring may be used for the normal hearing ear. While for a person that has hearing loss in both ears, two PCDs may be required, one for each ear. It is contemplated that each of the PCDs may be adjustable as a pair and/or they may be independently adjustable to allow people that have greater hearing loss in one ear to adjust each PCD as required. It is further contemplated that other embodiments of the PCD may be configured to wirelessly transmit the microphone signal from one ear to the other ear thereby creating a contralateral routing of signal (CROS) to be used for persons with single sided deafness.

Figure 2A:
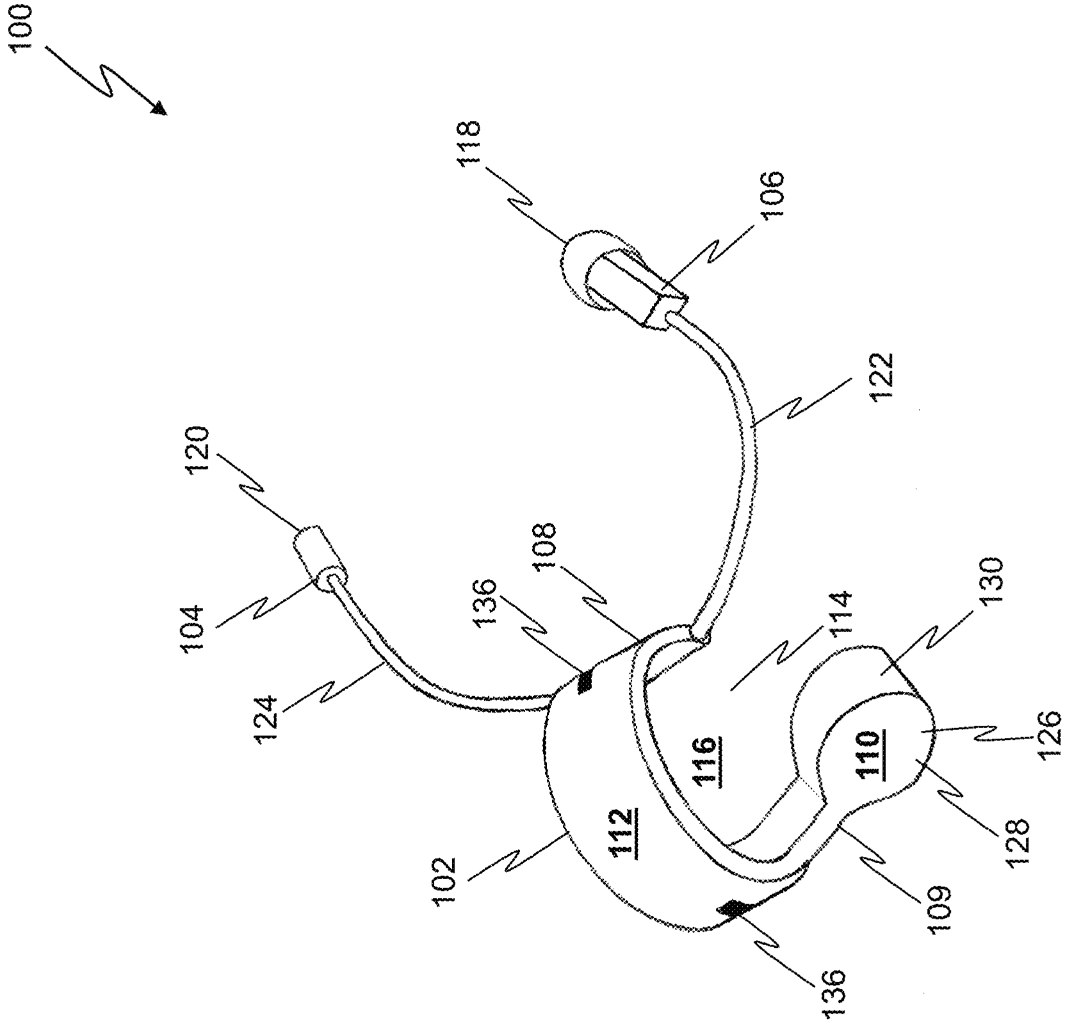
FIG. 2A is a front, perspective view of a Personal Communication Device (PCD), in accordance with one embodiment of the invention.
Figure 2B:
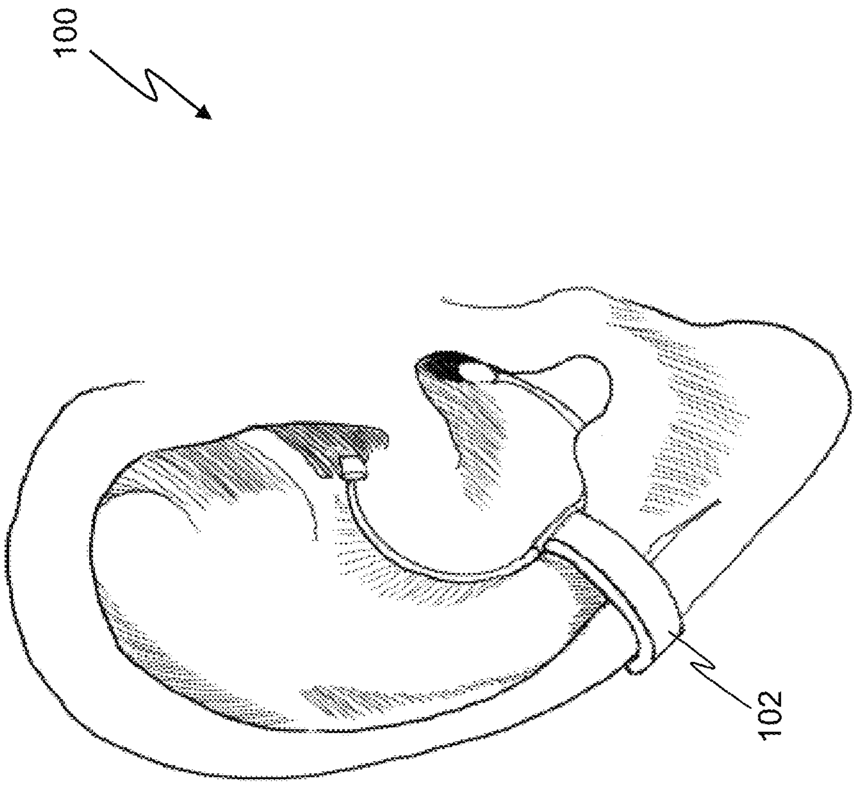
FIG. 2B is a front, side view of the Personal Communication Device (PCD) of FIG. 2A associated with the ear of a user, in accordance with one embodiment of the invention.

Referring to FIG. 2A and FIG. 2B, a Personal Communication Device (PCD) 100 is shown in accordance with one embodiment of the invention and includes a PCD body 102, a PCD receiver module 104 and a PCD speaker module 106. The PCD body 102 is shaped as a discontinuous cuff ring and includes a cuff first end 108 and a cuff second end 110 separated by a cuff middle portion 112. The PCD body 102 defines a cuff opening 114 and a cuff cavity 116, wherein the cuff opening 114 is communicated with the cuff cavity 116 and wherein the cuff opening 114 and cuff cavity 116 are sized to receive and contain at least a portion of the ear of a user. It should be appreciated that the PCD body 102 includes a body circumference and a body width, wherein the body circumference and body width may vary in size and may be sized to be associated with the ear of user in a snug and aesthetically pleasing fashion. The cuff first end 108 includes the PCD speaker module 106 and the PCD receiver module 104, wherein the PCD speaker module 106 further includes a PCD speaker 118 and the PCD receiver module 104 includes a PCD microphone 120. The PCD speaker 118 is physically connected to the cuff first end 108 via a speaker tube 122 and the PCD microphone 120 is physically connected to the cuff first end 108 via a microphone tube 124. It should be appreciated that the speaker tube 122 and microphone tube 124 may be hollow and flexibly configurable to allow the PCD speaker 118 and/or the PCD microphone 120 to be positionally configurable. This advantageously allows the PCD speaker 118 to be located proximate to the ear canal opening to allow sound from the PCD speaker 118 to be broadcast into the ear canal opening. This also advantageously allows the PCD microphone 120 to be located in the concha cymba of the user's ear to allow sound from an external source to be easily and clearly received. It should be appreciated that the cuff opening 114 and/or the cuff cavity 116 are configured to receive and contain a cuff spacer 200 (See FIG. 6) which may be secured to the PCD body 102 and located within the cuff cavity 116 to allow for the PCD 100 to be use with a variety of user ear sizes. These spacers 200 may be securely associated with the PCD body 302 via any method and/or device suitable to the desired end purpose, such as clips, magnets, friction, Velcro®, etc.

Additionally, it is contemplated that the speaker tube 122 and/or the microphone tube 124 may be configured to be flexible in position and expandable in length to allow the speaker tube 122 and/or the microphone tube 124 to be positionably configurable as well as lengthwise configurable. Accordingly, when the PCD 100 is associated with a user's ear, the flexible configurability of the speaker tube 122 and microphone tube 124 advantageously allows the PCD speaker 118 to be placed proximate the user's ear canal opening and the PCD microphone 120 to be placed proximate the ear's concha cymba. Additionally, the lengthwise configurability of the speaker tube 122 and microphone tube 124 advantageously allows the PCD speaker 118 to be placed farther into the user's ear canal opening and the PCD microphone 120 to be placed farther onto the ear's concha cymba. This would advantageously allow the placement of the PCD microphone 120 to be adjustably located on the ear's concha cymba to account for wind noise and acoustic performance and placement of the PCD speaker 118 farther into the user's ear canal to allow for a more direct injection of sound into the user's ear. It is contemplated that in one or more embodiments, the PCD speaker 118 may be a directional speaker configured to focus the emitted sounds at an intended target, which in this case would be the ear canal of a wearer. Additionally, it is contemplated that the location and/or separation of the PCD speaker 118 and the PCD microphone 120 are configured to be separated to reduce the chance of feedback and to increase the localization of sound.

Figure 3A:
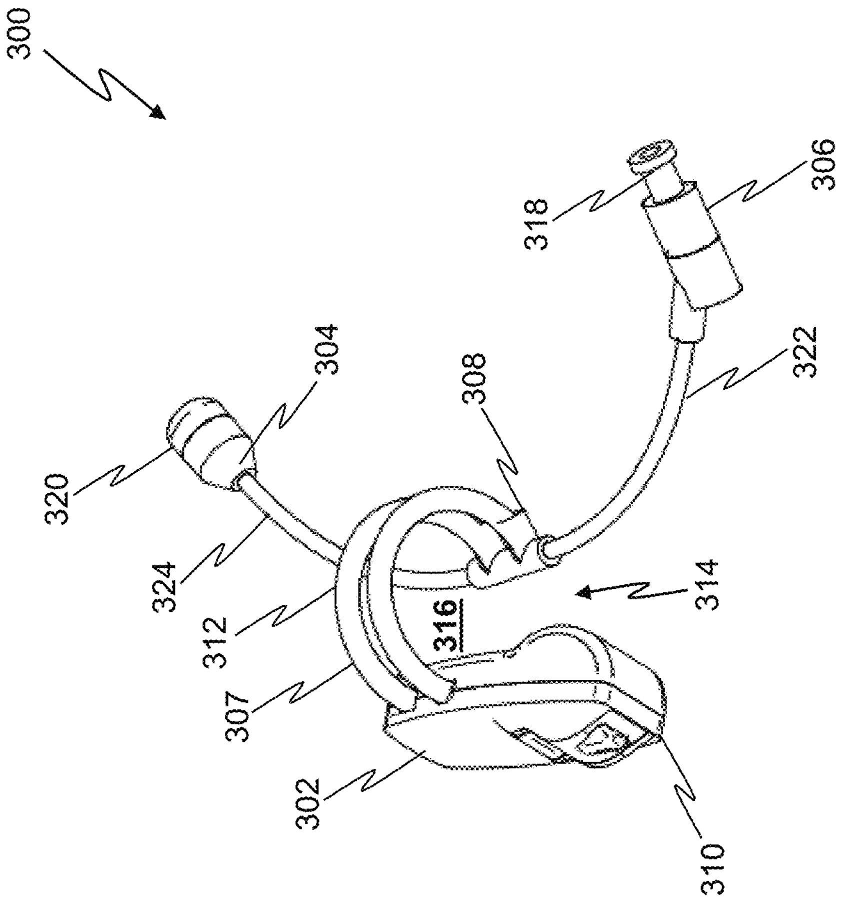
FIG. 3A is a front, side perspective view of a Personal Communication Device (PCD), in accordance with another embodiment of the invention.
Figure 3B:
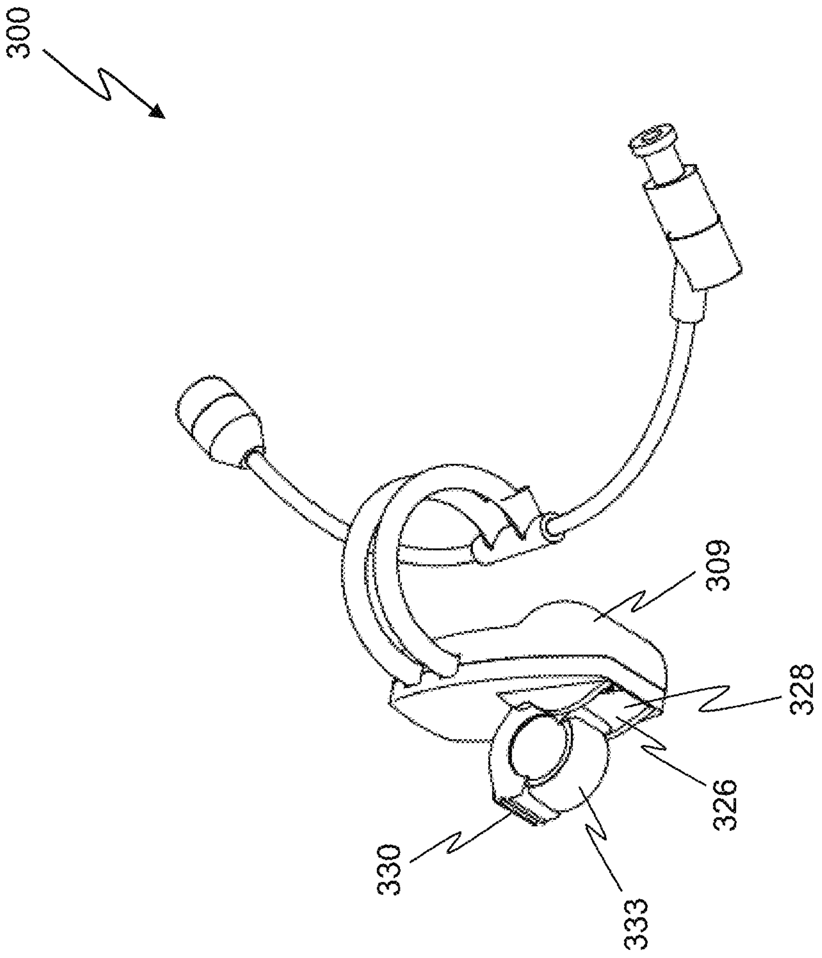
FIG. 3B is a front, side perspective view of the Personal Communication Device (PCD) of FIG. 3A showing the cavity cover open, in accordance with another embodiment of the invention.
Figure 3C:
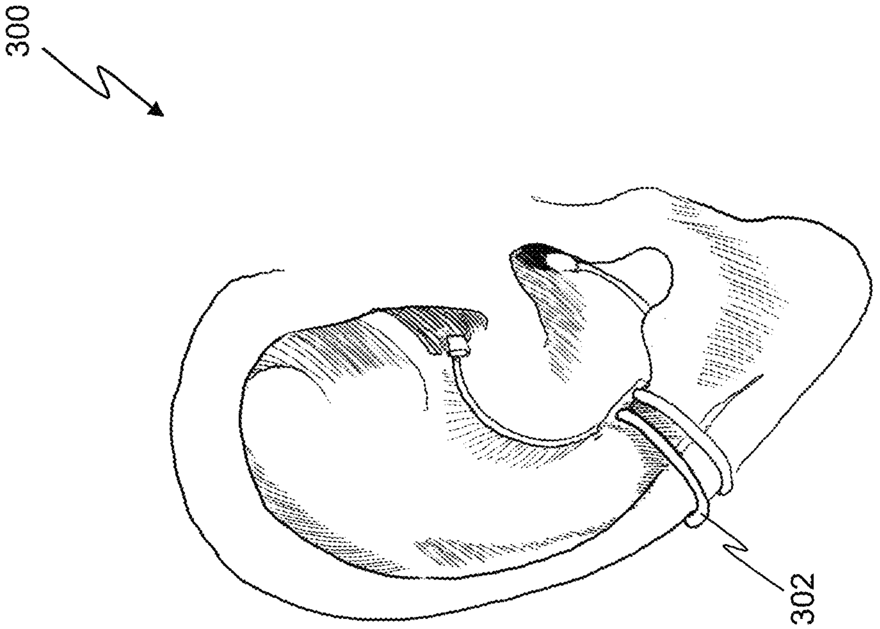
FIG. 3C is a front, side view of the Personal Communication Device (PCD) of FIG. 3A associated with the ear of a user, in accordance with one embodiment of the invention.

Referring to FIG. 3A, FIG. 3B and FIG. 3C, a Personal Communication Device (PCD) 300 is shown in accordance with another embodiment of the invention and includes a PCD body 302, a PCD receiver module 304 and a PCD speaker module 306. The PCD body 302 is configured to form a discontinuous cuff ring which includes a cuff first end 308 and a cuff second end 310 separated by a cuff middle portion 312, wherein the cuff middle portion 312 may be partially constructed from one or more elongated tubes or rings 307. The PCD body 302 defines a cuff opening 314 and a cuff cavity 316, wherein the cuff opening 314 is communicated with the cuff cavity 316. The cuff first end 308 includes the PCD speaker module 306 and the PCD receiver module 304, wherein the PCD speaker module 306 includes a PCD speaker 318 and the PCD receiver module 304 includes a PCD microphone 320. The PCD receiver module 306 is physically connected to the cuff first end 308 via a speaker tube 322 and the PCD receiver module 304 is physically connected to the cuff first end 308 via a microphone tube 324. It should be appreciated that the speaker tube 322 and microphone tube 324 may be hollow and flexibly configurable to allow the PCD speaker 318 and/or the PCD microphone 320 to be positionally configurable. This advantageously allows the PCD speaker 318 to be located proximate to the ear canal opening to allow sound from the PCD speaker 318 to be broadcast into the ear canal opening. This also advantageously allows the PCD microphone 320 to be located in the concha cymba of the user's ear to allow sound from an external source to be easily and clearly received. It should be appreciated that the cuff opening 314 and/or the cuff cavity 316 are configured to receive and contain the cuff spacer 200 which may be secured to the PCD body 302 and located within the cuff cavity 316 to allow for the PCD 300 to be use with a variety of user ear sizes. These spacers 200 may be securely associated with the PCD body 302 via any method and/or device suitable to the desired end purpose, such as clips, magnets, friction, Velcro®, etc.

Additionally, it is contemplated that the speaker tube 322 and/or the microphone tube 324 may be configured to be flexible in position and expandable in length to allow the speaker tube 322 and/or the microphone tube 324 to be positionably configurable as well as lengthwise configurable. Accordingly, when the PCD 300 is associated with a user's ear, the flexible configurability of the speaker tube 322 and microphone tube 324 advantageously allows the PCD speaker 318 to be placed proximate the user's ear canal opening and the PCD microphone 320 to be placed proximate the ear's concha cymba. Additionally, the lengthwise configurability of the speaker tube 322 and microphone tube 324 advantageously allows the PCD speaker 318 to be placed farther into the user's ear canal opening and the PCD microphone 320 to be placed farther onto the ear's concha cymba. This would advantageously allow the placement of the PCD microphone 320 to be adjustably located on the ear's concha cymba to account for wind noise and acoustic performance and placement of the PCD speaker 318 farther into the user's ear canal to allow for a more direct injection of sound into the user's ear. It is contemplated that in one or more embodiments, the PCD speaker 318 may be a directional speaker configured to focus the emitted sounds at an intended target, which in this case would be the ear canal of a wearer. Additionally, it is contemplated that the location and/or separation of the PCD speaker 318 and the PCD microphone 320 are configured to be separated to reduce the chance of feedback and to increase the localization of sound.

Moreover, it should be appreciated that the cuff second end 310 of the PCD 300 may include a PCD component structure 309 which defines a PCD component cavity 326 having a PCD component cavity opening 328 and a PCD component cavity cover 330 which is similar to the PCD component structure 109. The PCD component cavity 326 is sized to include a power source (i.e., power supply/battery) 333 and one or more electronic components, which may include a processing device, that are in signal connection (electrically and/or electromagnetically) with the PCD microphone 320 and/or the PCD speaker 318 to receive a sound signal from the PCD microphone 320, process the sound signal to generate a processed sound signal (i.e., such as filter, volume level adjust, strength level adjust, etc.) and communicate the processed sound signal to the PCD speaker 318 for output by the PCD speaker 318. Moreover, it is contemplated that at least one of the one or more elongated rings 307 may be configurably flexible and hollow to allow for the electronic components to be electrically connected to at least one of the PCD receiver module 304 and the PCD speaker module 306 via wires 512. Additionally, the elongated rings 307 may be any shape desired suitable to the desired end purpose, such as cylindrical, rectangular, triangular, octagonal, etc.

Figure 3D:
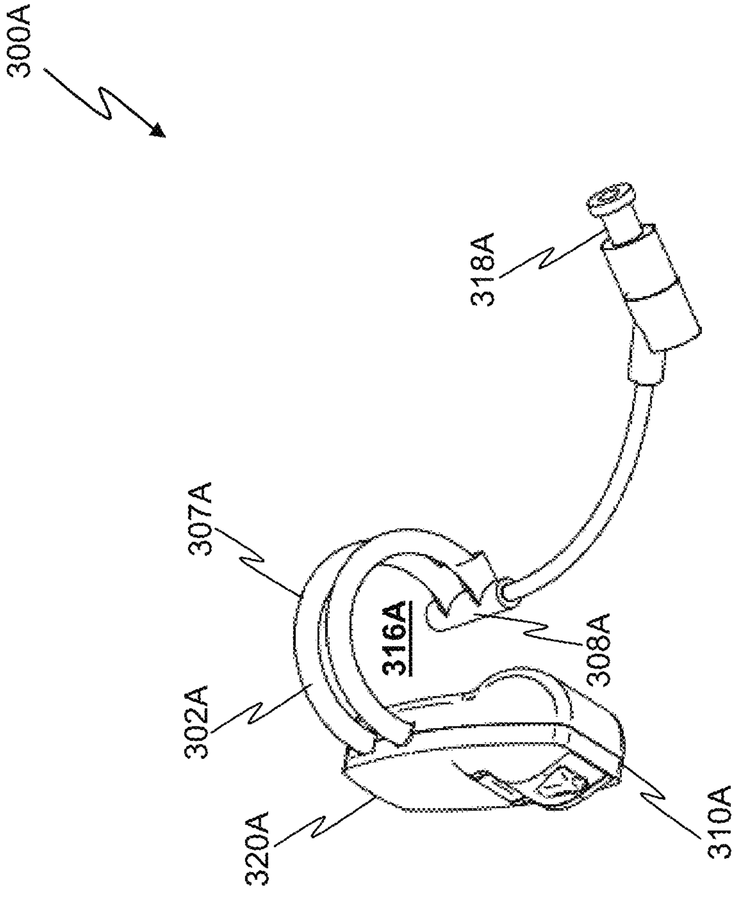
FIG. 3D is a front, side view of a Personal Communication Device (PCD), in accordance with still yet another embodiment of the invention.

Referring to FIG. 3D, an additional embodiment of the PCD 300A is shown, wherein the PCD body 302A includes a PCD microphone 320A which is located on the PCD body 302A proximate the cuff second end 310A. This configuration advantageously allows the PCD microphone 320A to be located behind the ear pinna which will help make the PCD 300A easier to securely associate with a user's ear and which will allow the PCD 300A to have more signal gain from the PCD microphone 320A without feedback from the PCD speaker 318A. In accordance with the present invention, the PCD body 302/302A is configured such that when the PCD body 302/302A is worn by a user, the cuff second end 310/310A is located behind the pinna of the ear, the cuff first end 308A is located within the ear concha and the ear helix/antihelix are located within the cuff cavity 316A. The cuff cavity 316A may be sized (or configurably sizable) to snugly associate with and contain the ear pinna of the user.

Figure 3E:
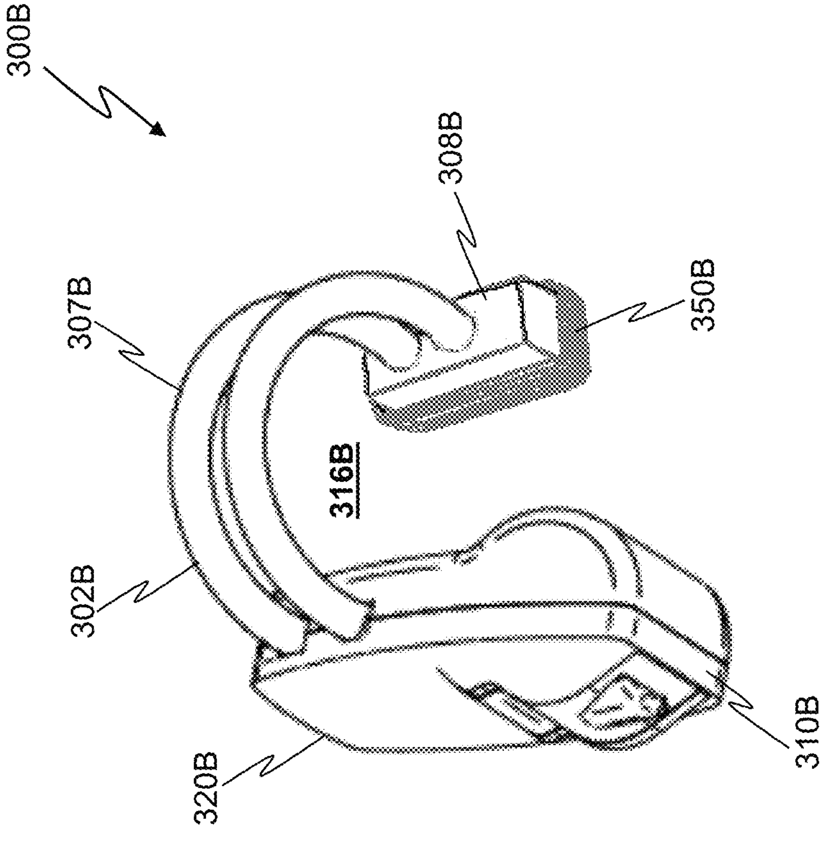
FIG. 3E is a front, side view of a Personal Communication Device (PCD), in accordance with still yet another embodiment of the invention.

Referring to FIG. 3E, an additional embodiment of the PCD 300B is shown, wherein the PCD body 302B includes a PCD microphone 320B which is located on the PCD body 302B proximate the cuff second end 310B. Additionally, the PCD 300B is shown having a bone oscillation device 350B which is configured to contact the ear concha cartilage. It is contemplated that in one or more embodiments, the PCD 300B may be configured such that the bone oscillation device 350B may be in contact with the skin covering the bone of the user's skull proximate the user's ear. This would allow the vibrations generated by the bone oscillation device 350B to be 'heard' by the ear of the user. Moreover, it is contemplated that one or more structures/parts of the PCD 300B may be constructed from a vibration insulating material to isolate the PCD microphone 320B from the vibration of the bone oscillation device 350B. It should be appreciated that sound signal received by the PCD microphone 320B is processed by the one or more electronic components located within the PCD component cavity 326 (such as by an amplifier 502) to generate a processed sound signal. The processed sound signal is communicated to the bone oscillation device 350B which vibrates in response to the processed sound signal and because the bone oscillation device 350B is contacting the cartilage of the ear of the user, the vibrations from the bone oscillation device 350B is transferred to the cochlea of the user's ear. This configuration advantageously allows the PCD speaker 318, 318A to be replaced by the bone oscillation device 350B. In accordance with the present invention, the PCD body 302/302B is configured such that when the PCD body 302/302B is worn by a user, the cuff second end 310/310B (i.e., PCD microphone) is located behind the pinna of the ear to reduce feedback, the cuff first end 308B is located within the ear concha to be in contact with the concha cavum cartilage and the ear helix/antihelix are located within the cuff cavity 316B. The cuff cavity 316B may be sized (or configurably sizable) to snugly associate with and contain the ear pinna of the user.

Referring again to FIG. 2A, FIG. 3A, FIG. 3B, FIG. 3D, FIG. 4A, FIG. 4B, FIG. 4C, FIG. 4D and FIG. 4E, a sectional view of the cuff second end 310 includes a PCD component structure 309 which defines the PCD component cavity 326 having the PCD component cavity opening 328 and the PCD component cavity cover 330. It should be appreciated that the PCD component cavity cover 330 is configurable between a first configuration 332 and a second configuration 334, wherein when the PCD component cavity cover 330 is in the first configuration 332, the PCD component cavity cover 330 covers the PCD component cavity opening 328 to enclose the PCD component cavity 326, and when the PCD component cavity cover 330 is in the second configuration 334, the PCD component cavity cover 330 is located away from the PCD component cavity opening 328 to allow access to the PCD component cavity 326 via the PCD component cavity opening 328. The PCD component cavity 326 is sized to include an amplifier 502, an antenna 504, a switch 508 and the battery (i.e., power supply/battery/rechargeable battery) 333 and one or more other electronic components, which may include a processing device, that are in signal connection (electrically and/or wirelessly) with the PCD microphone 320 and/or the PCD speaker 318 to receive a sound signal from the PCD microphone 320, process the sound signal to generate a processed sound signal (i.e., such as filter, volume level adjust, strength level adjust, etc.) and communicate the processed sound signal to the PCD speaker 318 for output by the PCD speaker 318.

Figure 4A:
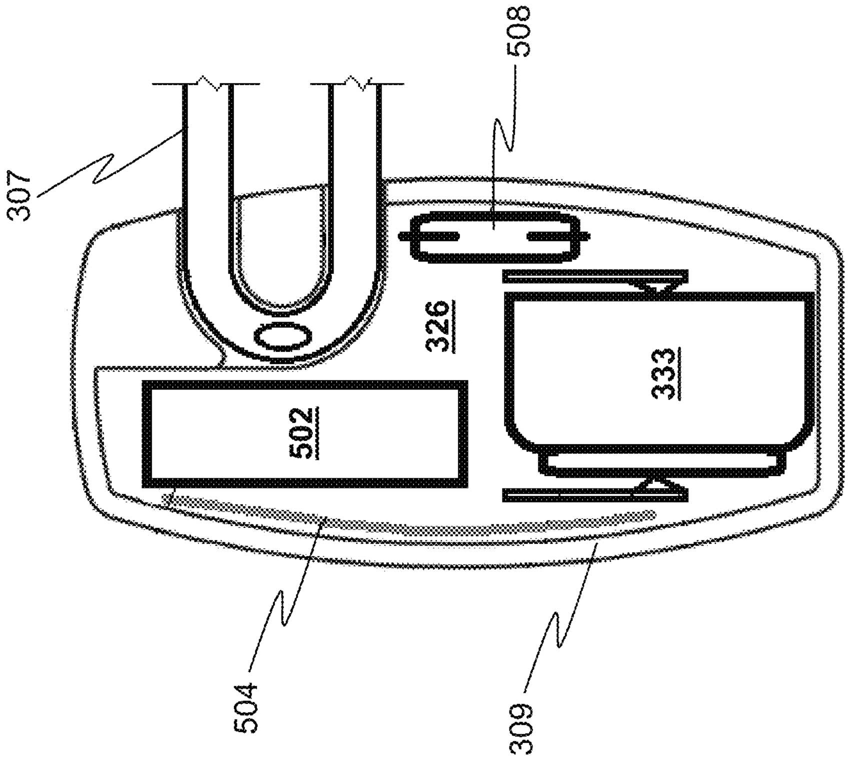
FIG. 4A is a front, sectional view of the PCD body of the Personal Communication Device (PCD) of FIG. 3A, in accordance with one embodiment of the invention.
Figure 4B:
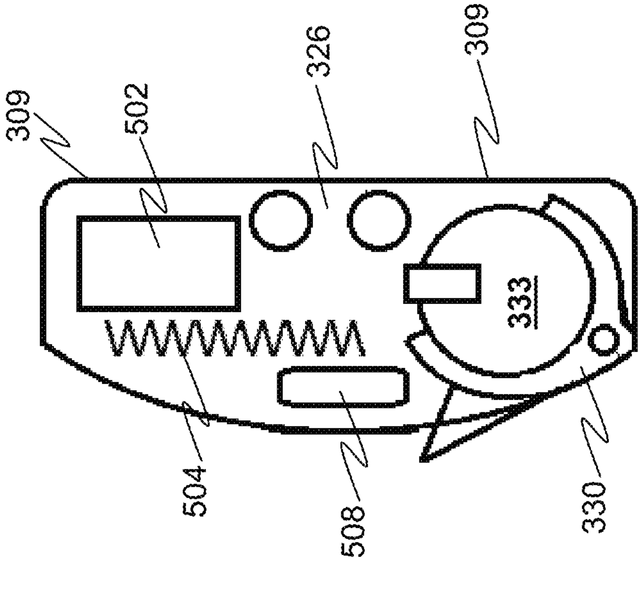
FIG. 4B is a side, sectional view of the PCD body of FIG. 4A, in accordance with one embodiment of the invention.
Figure 4C:
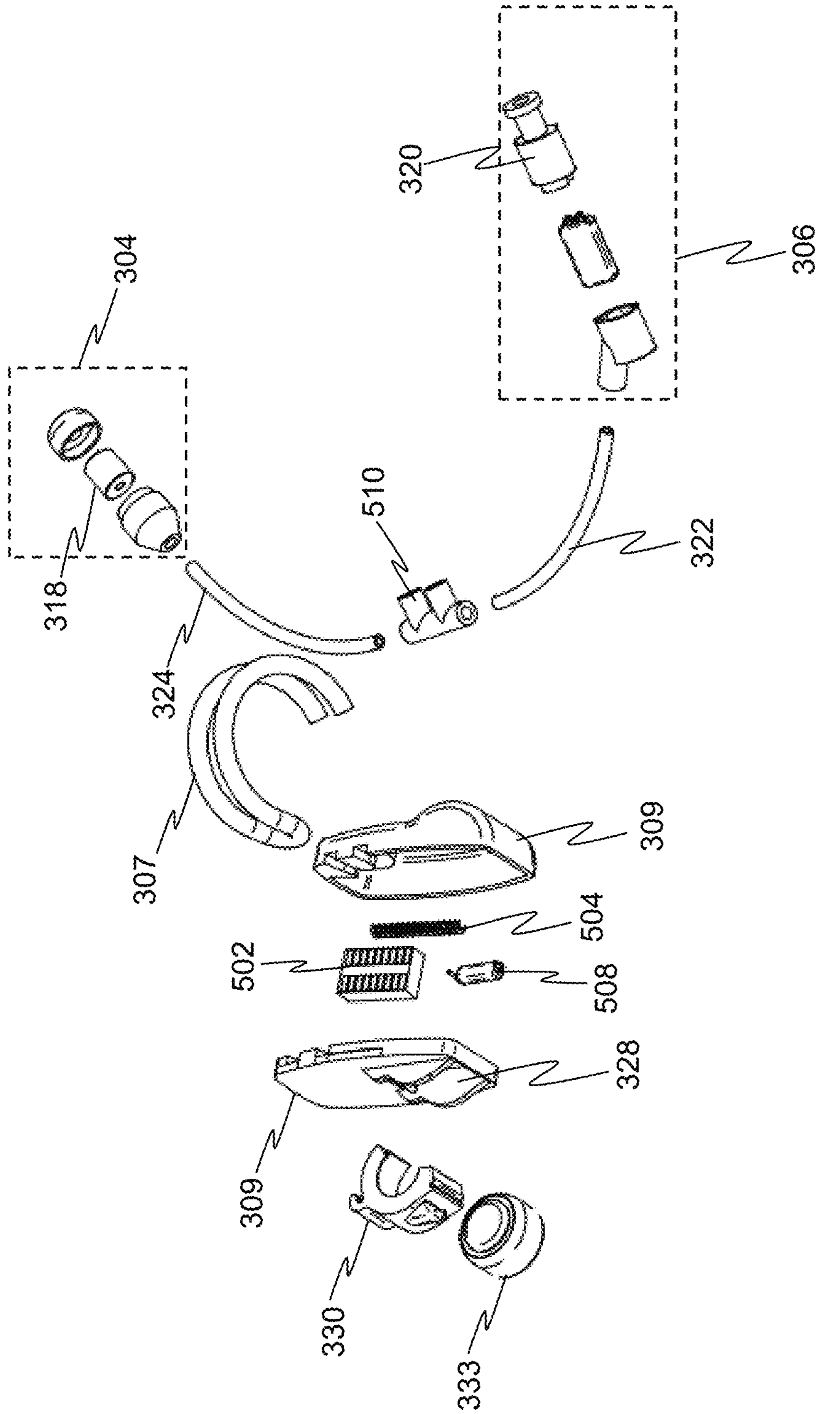
FIG. 4C is an exploded view of the Personal Communication Device (PCD) of FIG. 3A, in accordance with one embodiment of the invention.
Figure 4E:
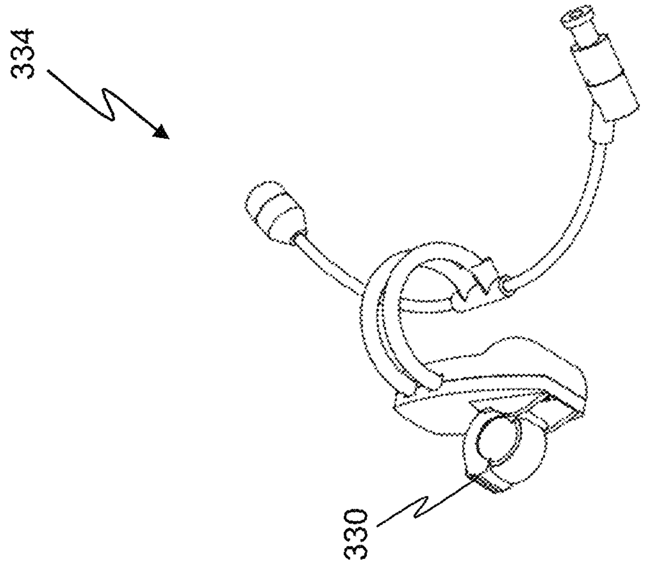
FIG. 4E is a front view of the PCD body of the Personal Communication Device (PCD) of FIG. 3A with the PCD component cavity cover open, in accordance with one embodiment of the invention.
Figure 4D:
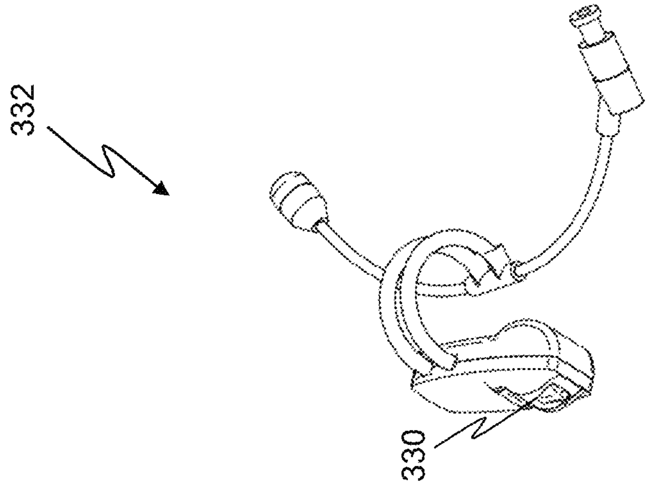
FIG. 4D is a front view of the PCD body of the Personal Communication Device (PCD) of FIG. 3A with the PCD component cavity cover closed, in accordance with one embodiment of the invention.
Figure 4F:
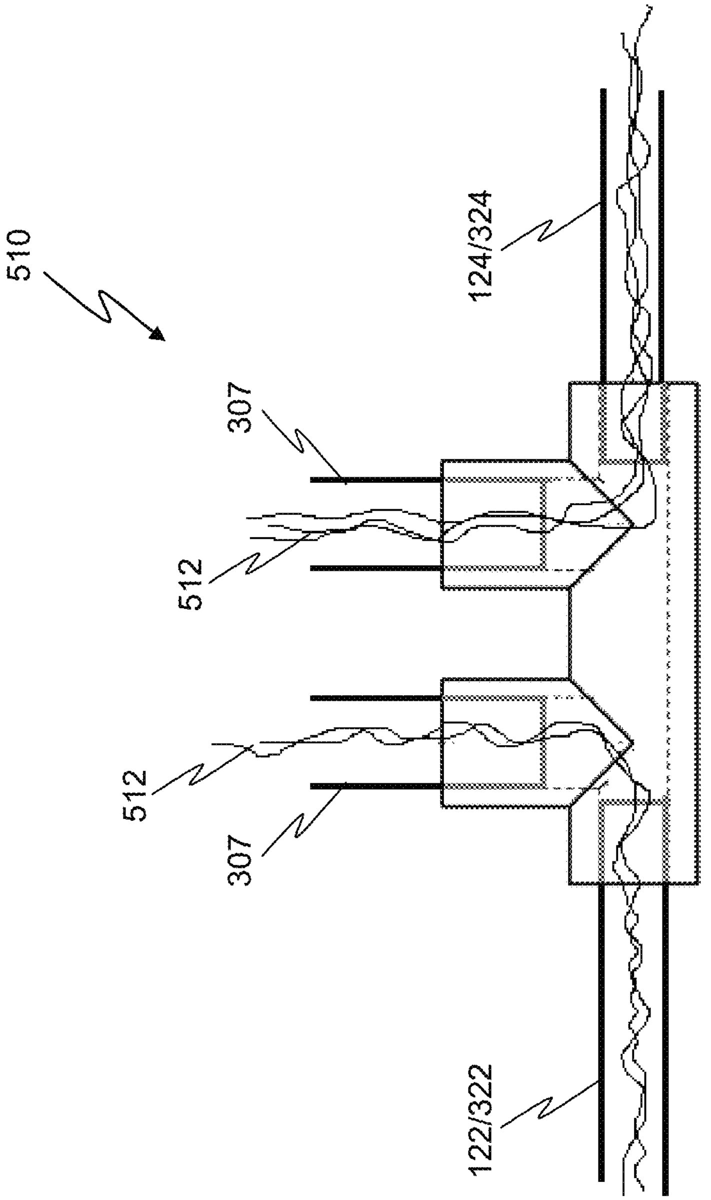
FIG. 4F is a front, sectional view of a coupler for the PCD of FIG. 3A associated with the microphone tube and speaker tube of the PCD body of the PCD of FIG. 3A, in accordance with one embodiment of the invention.

Referring to FIG. 4F, a coupler 510 is provided to connect the microphone tube 124 and speaker tube to the one or more elongated tubes or rings 307. It should be appreciated that one or more of the one or more elongated tubes or rings 307 which extends between the cuff first end 308 and the cuff second end 310 may be hollow, the speaker tube 322 may define a speaker tube cavity which extends the length of the speaker tube 322 and the microphone tube 324 may define a microphone tube cavity which extends the length of the microphone tube 324. This advantageously allows the PCD speaker 318 and/or the PCD microphone 320 to be connected via wire 512 with the power source 332 and the one or more electronic components located within the PCD component cavity 326.

Referring to the Figures, it should be appreciated that in one embodiment that the PCD body 102, 302 and/or any part of the PCD 100, 300, may be constructed, in whole or in part, from any material, or combination of materials, suitable to the desired end purpose, such as plastic, composite, metal, silver, gold, platinum, stainless steel, etc. For example, if the PCD 100, 300 is configured as high-end jewelry, then the PCD body 102, 302 may be constructed from a metal such as silver, gold and/or platinum and/or may contain decorative features such as precious gems/stones. Moreover, the cuff middle portion 112, 312 may be hollow to allow for connection wires 512 between the processing circuitry and the PCD speaker 118, 318 and the PCD microphone 120, 320. Additionally, the cuff middle portion 112, 312 may include one or more body notches 136 configured to engage with a jewelry cover to allow the jewelry cover to be held in place on the cuff middle portion 112, 312. Moreover, although it is contemplated that in one or more embodiments, the PCD 100, 300 may be available as an 'off-the-shelf' product, it is contemplated that in other embodiments the PCD 100, 300 may be specifically designed or 'fitted' to the user.

Figure 5:
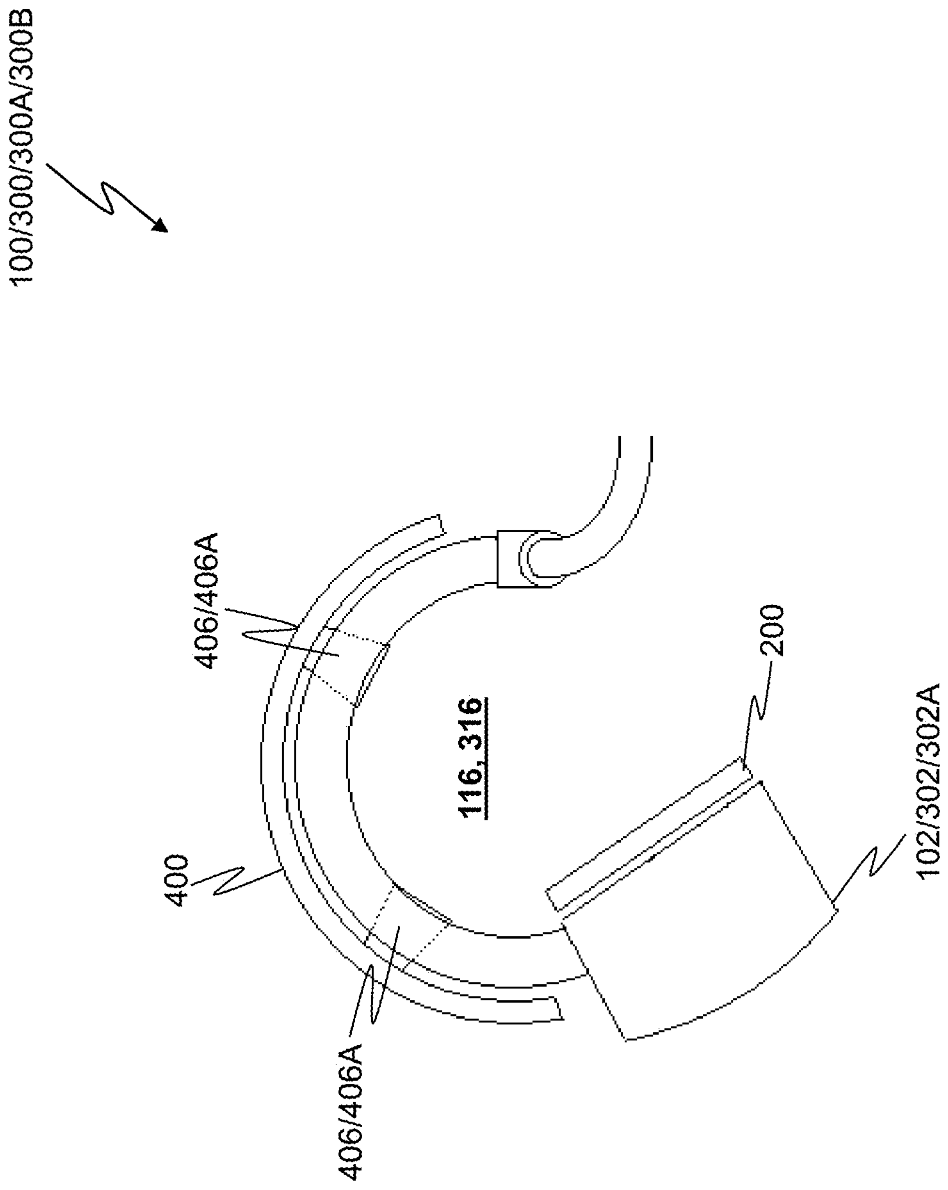
FIG. 5 is a side view of a decorative jewelry cover securingly associated with the Personal Communication Device (PCD) of FIG. 2A, FIG. 3A and FIG. 3D, in accordance with one embodiment of the invention.
Figure 6:
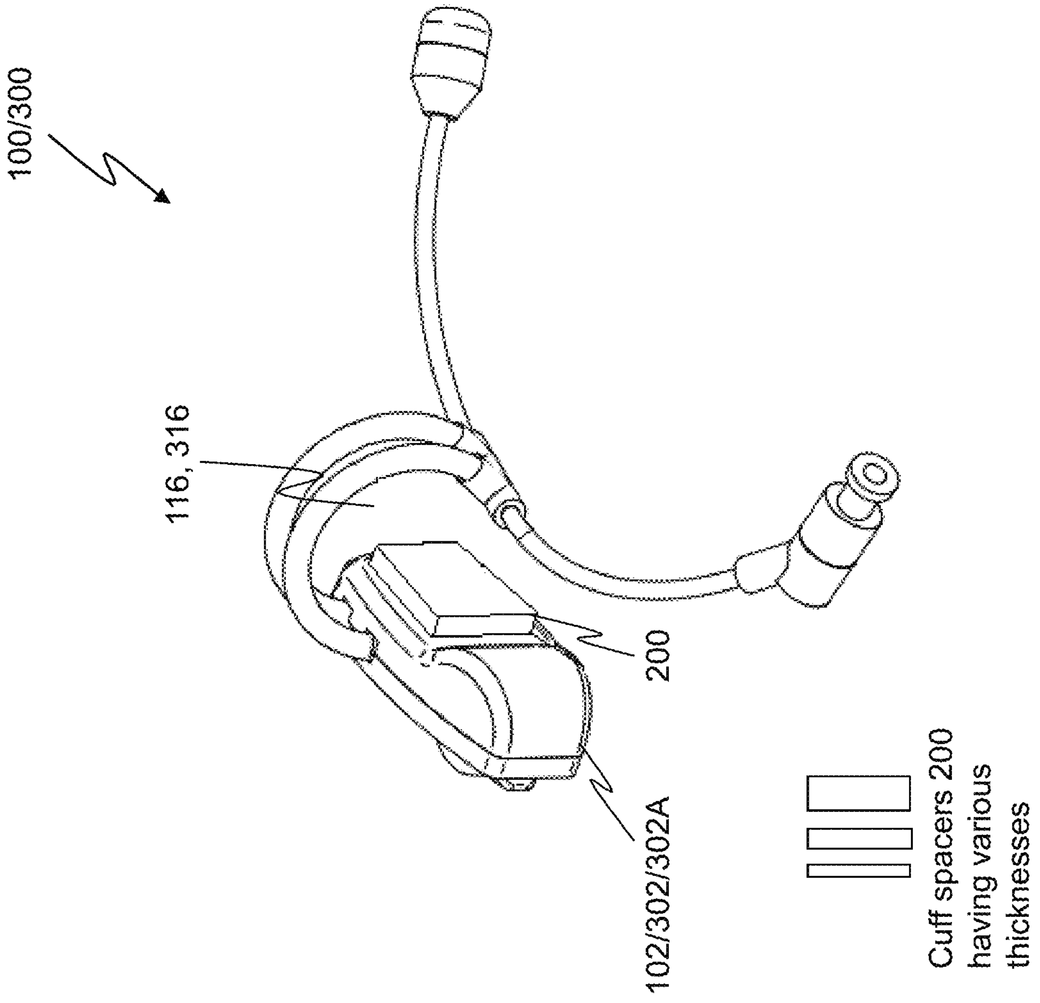
FIG. 6 is a side view of a cuff cavity insert securely located within the cuff cavity of the PCD of FIG. 3A, in accordance with one embodiment of the invention.
Figure 7:
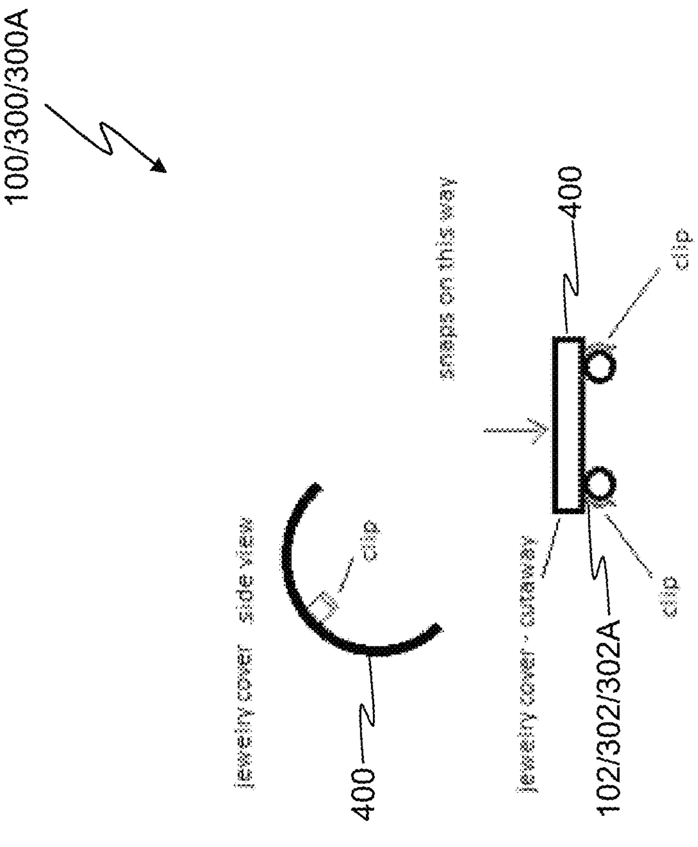
FIG. 7 is a side view of a decorative jewelry cover being securingly associated with the Personal Communication Device (PCD) of FIG. 3A and FIG. 3D, in accordance with one embodiment of the invention.
Figure 8:
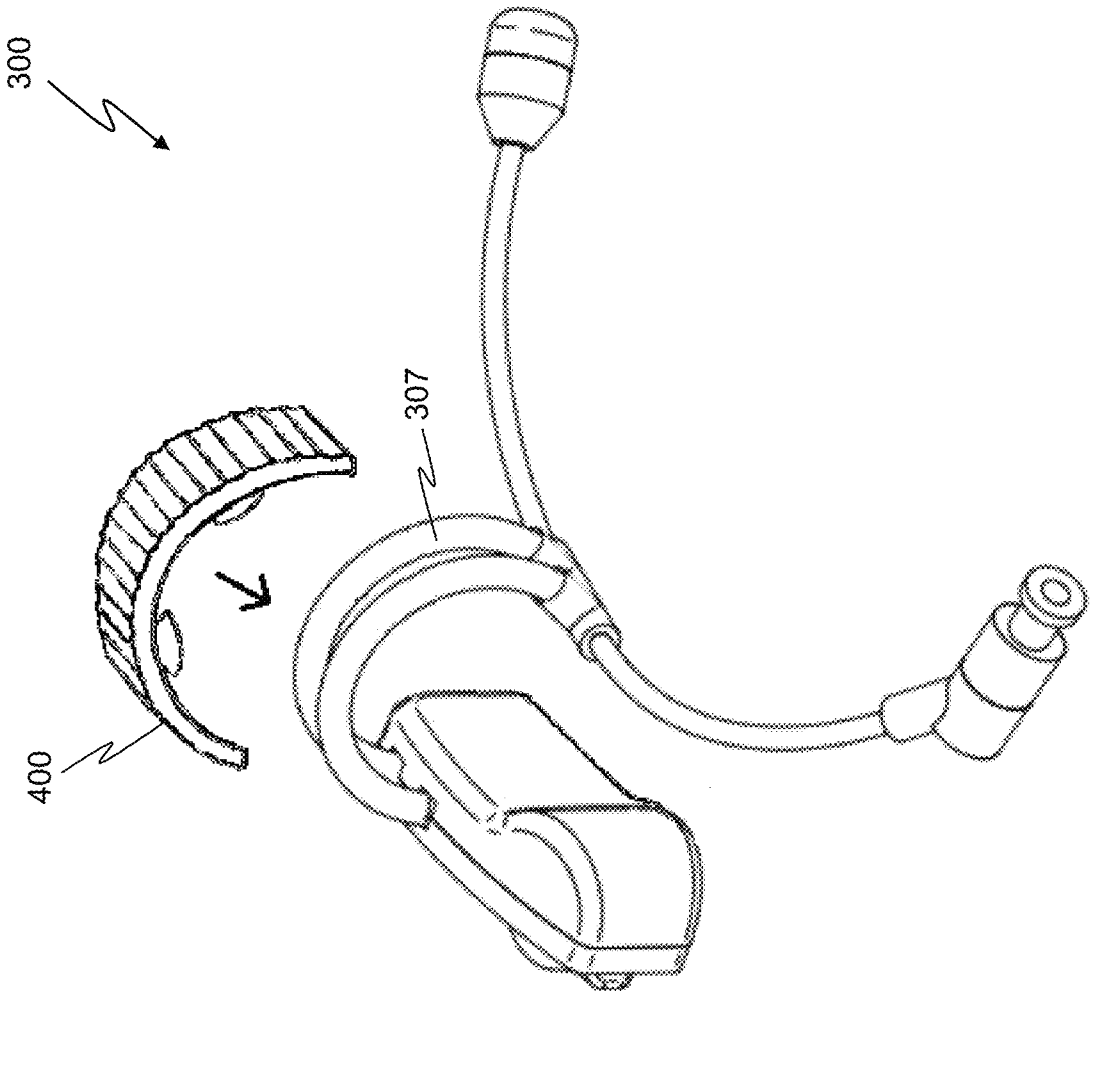
FIG. 8 is a side perspective view of a decorative jewelry cover being securely associated with the Personal Communication Device (PCD) of FIG. 3A and FIG. 3D, in accordance with another embodiment of the invention.
Figure 9:
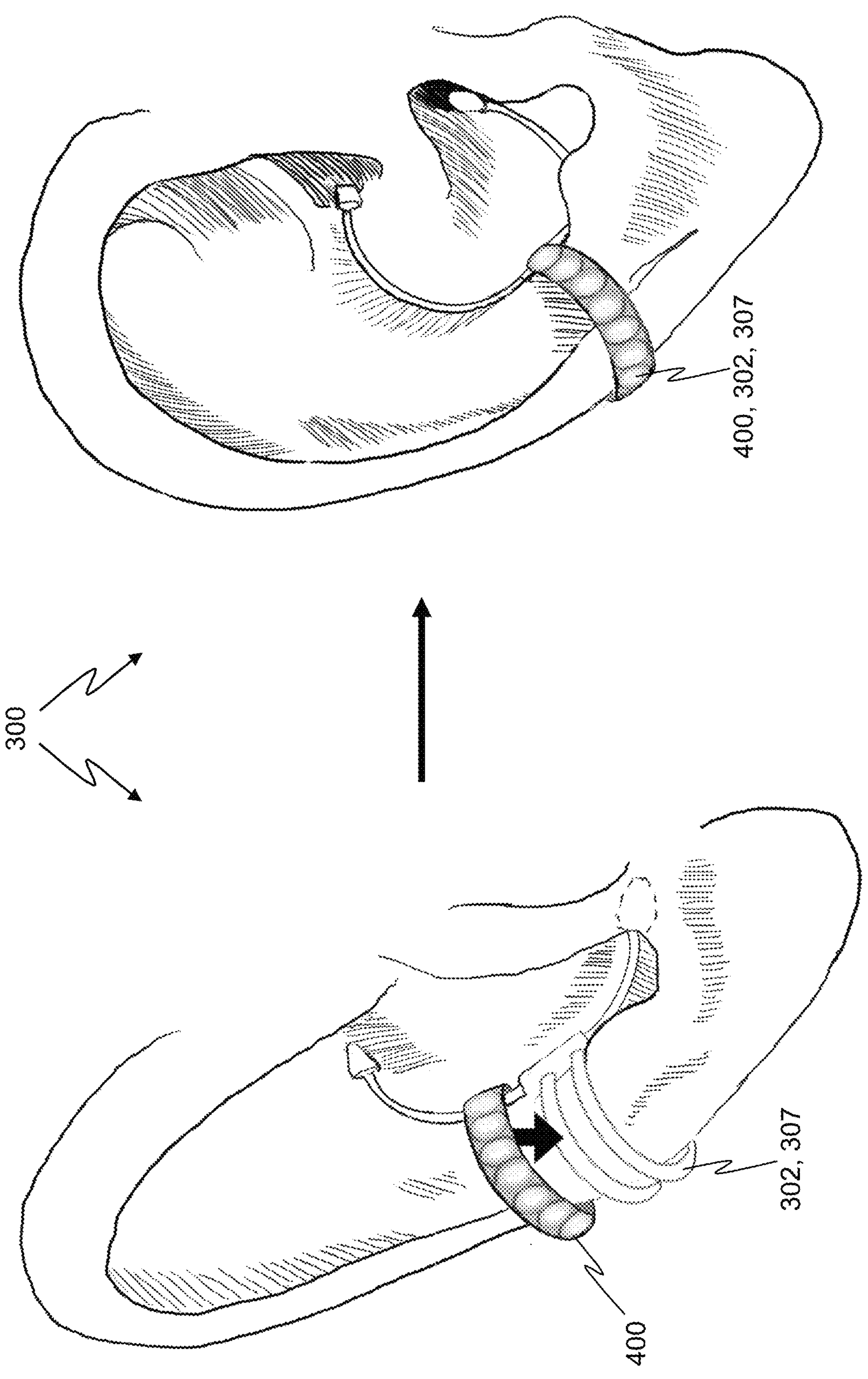
FIG. 9 is a side perspective view of a decorative jewelry cover being securely associated with the Personal Communication Device (PCD) of FIG. 3A as the PCD is associated with the ear of a user, in accordance with yet another embodiment of the invention.
Figure 10A:
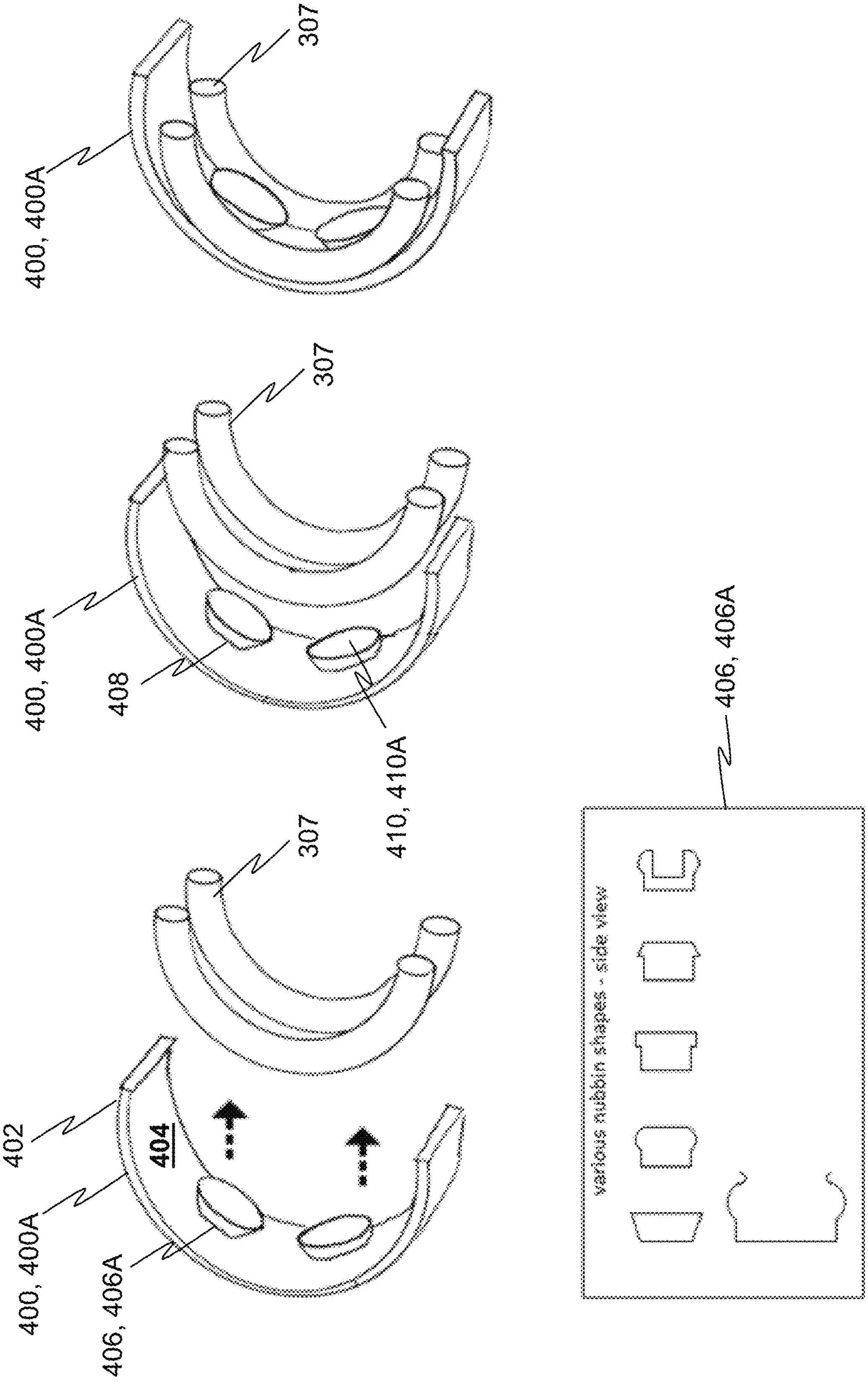
FIG. 10A is a side perspective view of a decorative jewelry cover being securely associated with the PCD body of the Personal Communication Device (PCD) of FIG. 3A and FIG. 3D, in accordance with yet another embodiment of the invention.
Figure 10B:
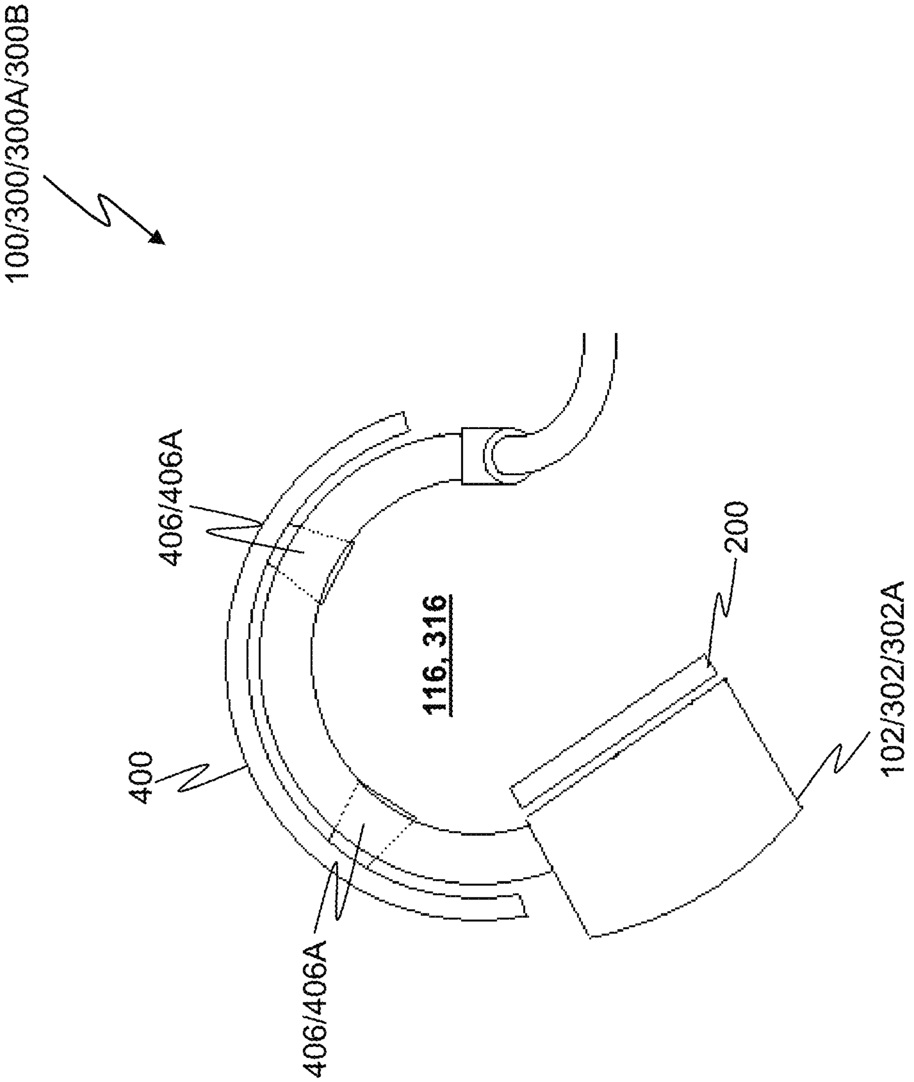
FIG. 10B is a side perspective view of a decorative jewelry cover being securely associated with the PCD body of the Personal Communication Device (PCD) of FIG. 3A and FIG. 3D, in accordance with the embodiment of FIG. 10A.
Figure 11A:
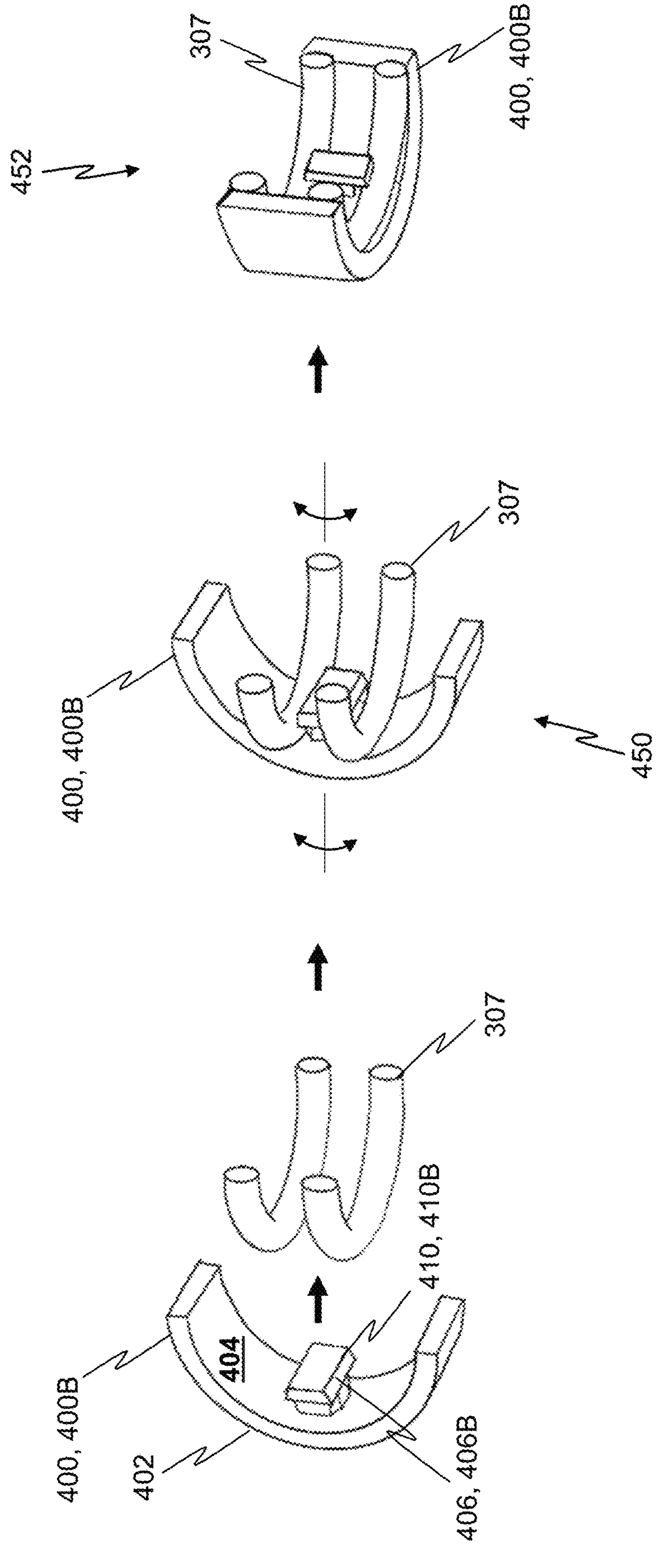
FIG. 11A is a side perspective view of a decorative jewelry cover being securely associated with the PCD body of the Personal Communication Device (PCD) of FIG. 3A and FIG. 3D, in accordance with still yet another embodiment of the invention.
Figure 11B:
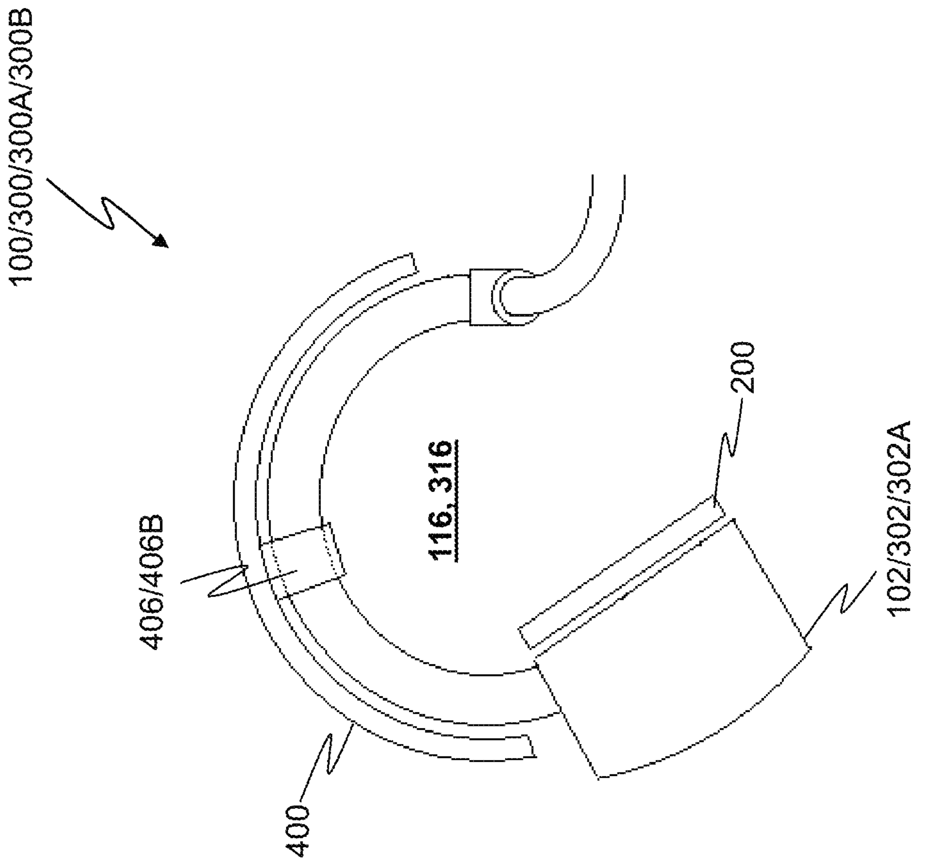
FIG. 11B is a side perspective view of a decorative jewelry cover being securely associated with the PCD body of the Personal Communication Device (PCD) of FIG. 3A and FIG. 3D, in accordance with the embodiment of FIG. 11A.

Referring to FIG. 5 and FIG. 6, it is contemplated that in one or more embodiments of the invention, the cuff cavity insert, or spacer, 200 may be configured to be securely located within the cuff cavity 116, 316 to adjust the size of the cuff cavity 116, 316 to fit the variously different sizes of a user's pinna. It should be appreciated that the cuff cavity spacer 200 may be configured to associate with the PCD body 102/302/302A/302B via a magnet, friction fit, clip, etc., and/or any other method and/or device suitable to the desired end purpose such that the cuff cavity spacer 200 may be securely located and contained within the cuff cavity 116, 316, 316A, 316B. Additionally, referring to FIG. 7, FIG. 8, FIG. 9, FIG. 10 and FIG. 11, a decorative jewelry article 400 may be configured to securingly engage with and cover at least a part of the external portion of the PCD body 102/302/302A/302B. It should be appreciated that the decorative jewelry article 400 may securely associate with the PCD body 102/302/302A/302B via any device/method suitable to the desired end purpose, such as a magnet, a clip, etc.

Referring again to FIG. 10A, FIG. 10B, FIG. 11A and FIG. 11B, embodiments of a decorative jewelry article 400 are shown and includes an article top 402, an article bottom 404 and an interface knob 406 protruding out of and away from the article bottom 404. The interface knob 406 is configured to have a knob base 408 and a knob top 410, wherein the knob base 408 is smaller in size than the knob top 410. It should be appreciated that the interface knob 406 is configured to securely associate with the one or more elongated tubes or rings 307 of the PCD body 302/302A/302B. For example, referring again to FIG. 10A and FIG. 10B, in one embodiment, the decorative jewelry article 400A includes one or more interface knobs 406A, wherein the one or more interface knobs 406A are configured to snugly fit between the one or more elongated tubes or rings 307. The knob top 410A of the one or more interface knobs 406A may be made to be pressed into the space between the one or more elongated tubes or rings 307 such that the one or more interface knobs 406A are frictionally contained in the space between the one or more elongated tubes or rings 307. This snugly associates the decorative jewelry article 400A with the PCD body 302.

In accordance with another embodiment and referring again to FIG. 11A and FIG. 11B, the decorative jewelry article 400B includes an interface knob 406B, wherein the interface knob 406B is configured to snugly fit between the one or more elongated tubes or rings 307. In this embodiment, the decorative jewelry article 400B is configurable between a first configuration 450 and a second configuration 452. In the first configuration 450, the decorative jewelry article 400B is oriented to be approximately perpendicular to the one or more elongated tubes or rings 307 and the knob top 410B of the interface knob 406B is oriented to pass through the space between the one or more elongated tubes or rings 307. Accordingly, the knob top 410B may be inserted into the space between the one or more elongated tubes or rings 307 such that the knob top 410B is located between the one or more elongated tubes or rings 307 and the article bottom 404B. The decorative jewelry article 400B is then rotated to orient the decorative jewelry article 400B to be parallel with the one or more elongated tubes or rings 307 such that the knob top 410B is securely contained between the one or more elongated tubes or rings 307 and the article bottom 404B. This snugly associates the decorative jewelry article 400B with the PCD body 302.

It should be noted that the PCD 100, 300 may be equipped with stock speaker tips of various sizes and/or a custom earpiece which may be attached to the end of the speaker module 106/306 to accommodate different degrees of hearing loss. For example, for someone with mild hearing loss, the speaker tip may have vents or openings to keep the ear canal less occluded. While for some with a moderate or severe hearing loss, the speaker tip may be solid and/or occlude a greater portion (or perhaps the entire portion) of the ear canal. It is also contemplated that in some cases, the use of a custom molded ear tip and/or earmold may be utilized. Moreover, it is further contemplated that the PCD 100, 300 may be configured such that one or more components of the PCD microphone module 104, 304 (i.e., microphone tip, etc.), the PCD speaker module 106, 306 (i.e., speaker tip, bone oscillation device 350B, etc.) may be replaceable as desired. It should be appreciated that the PCD 100, 300 may be configured to wirelessly communicate with remote devices via any method suitable to the desired end purpose, such as Bluetooth®, WiFi, etc. Accordingly, the PCD 100, 300 may be configured to wirelessly communicate with a communication system (such as a television, a telephone system, a music system and/or a computer system) such that sound from the communication system can be wirelessly communicated to the PCD 100, 300 such the PCD 100, 300 will receive sound data directly from the communication system (music, phone sound, television sound, etc.). This will advantageously allow the PCD 100, 300 to communicate this sound data to a user of the PCD 100, 300 in a more controlled, clear and noise free manner.

Moreover, in still yet another embodiment, the PCD 100, 300 may be configured to interact with remote sound receiving sources via wired and/or wireless communication (Bluetooth, WIFI, NFC), such as a remotely located speaker and/or a cell phone. This capability would advantageously allow a user to place a cell phone close to a sound source (i.e., a person who is speaking) and have the sound from the sound source be transmitted to the PCD 100, 300 where the sound may be transmitted directly out of the PCD speaker 118, 318 or the sound may be processed for feedback and/or other conditioning prior to being transmitted out of the PCD speaker 118, 318. Additionally, the PCD 100, 300 may be configured to receive sound data (i.e., music and or voice) from a user's cell phone, television, radio and/or laptop. This would advantageously allow a user to listen and/or interact with gaming platforms, music platforms, audio tapes, podcasts, movies, etc. without the use of additional sound receiving devices.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part as desired without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A Personal Communication Device (PCD) comprising:

a microphone, a speaker, and a PCD body, wherein the PCD body is configured as an ear cuff and includes a cuff first end, a cuff second end and a body middle portion, wherein the cuff second end is associated with the cuff first end via the body middle portion, and wherein the cuff second end includes a body structure which defines a component cavity for containing a power source, and sound processing electronics, and wherein the cuff first end is oriented to be perpendicular to the body middle portion and includes the speaker and the microphone, and wherein the body middle portion is further configured to securely associate with the microphone via a microphone tube, and wherein the body middle portion is at least one of a hollow rectangular structure and one or more hollow tubes, and is configured to be curved in shape and to securely associate with the speaker via a speaker tube, and wherein the speaker is communicated with the power source and the sound processing electronics, such that when a sound is received by the microphone, the sound processing electronics processes the sound to generate processed sound data and communicates the processed sound data to the speaker, and wherein the PCD is configured to be securely associated with an ear of a user such that when the PCD is associated with the ear of the user, the speaker is located proximate an ear canal of the user and the body structure is located proximate the rear portion of the ear antihelix, and wherein the PCD is configured for wireless connectivity.

2. The Personal Communication Device (PCD) of claim 1, wherein the sound processing electronics include at least one of a processing device, an amplification device, a speaker tube associated with the speaker, at least one switch configured for programming at least one of a tone and volume of the PCD and an antenna.

3. The Personal Communication Device (PCD) of claim 2, wherein the speaker tube is connected to the body middle portion, wherein the speaker tube is hollow, controllably flexible and extendable lengthwise, and wherein the speaker is electrically connected to the sound processing electronics via wires which are at least partially located within the speaker tube.

4. The Personal Communication Device (PCD) of claim 1, further comprising a decorative jewelry cover, wherein at least one of the body middle portion is configured to securely associate with a decorative jewelry cover, and the decorative jewelry cover is configured to securely associate with the body middle portion.

5. The Personal Communication Device (PCD) of claim 4, wherein the decorative jewelry cover is configured to engage with and cover the body middle portion.

6. The Personal Communication Device (PCD) of claim 1, wherein the PCD body includes a PCD cavity cover configurable between an open configuration and a closed configuration, and wherein the power source located within the PCD body cavity and is at least one of a battery and a rechargeable cell.

7. The Personal Communication Device (PCD) of claim 1, wherein the PCD is configured such that when worn by the user, the speaker is located proximate the entrance to the user's ear canal.

8. The Personal Communication Device (PCD) of claim 1, wherein the PCD is configured to wirelessly communicate with a remote device to allow the remote device to control functions of the PCD.

9. A Personal Communication Device (PCD) comprising:

a microphone, a speaker, and a PCD body, wherein the PCD body is configured as an ear cuff and includes a cuff first end, a cuff second end and a body middle portion, wherein the cuff first end is oriented to be perpendicular to the body middle portion and wherein the body middle portion is at least one of a hollow rectangular structure and one or more hollow tubes and is configured to be curved in shape and to securely associate with the speaker via a speaker tube and the microphone via a microphone tube, wherein the PCD body includes sound processing electronics, such that when a sound is received by the microphone, the sound processing electronics processes the sound to generate processed sound data and communicates the processed sound data to the speaker and outputs the processed sound data into the user's ear canal, wherein the PCD is configured to be securely associated with an ear of a user such that when the PCD is associated with the ear of the user, the speaker is located proximate an ear canal of the user, and wherein the PCD is configured for wireless connectivity.

10. The Personal Communication Device (PCD) of claim 9, wherein the cuff second end includes a body structure which defines a component cavity for containing a power source, and the sound processing electronics, and wherein the cuff first end includes the speaker and the microphone, and wherein the speaker and the microphone are communicated with the power source and the sound processing electronics, and wherein the PCD is configured to be securely associated with an ear of a user such that when the PCD is associated with the ear of the user the body structure is located proximate rear portion of at least one of the ear antihelix and the ear helix.

11. The Personal Communication Device (PCD) of claim 10, wherein the sound processing electronics include at least one of a processing device, an amplification device, at least one switch configured for programming at least one of the tone and volume of the PCD and an antenna.

12. The Personal Sound Amplification System of claim 11, wherein the PCD is configured to wirelessly communicate with at least at least one of, a remote device to allow the remote device to control functions of the PCD, a magnetic wand, and a wireless device, wherein at least one of, the switch is configured to program at least one of the tone and volume of the PCD when the magnetic wand is located proximate to the magnetic switch, and the wireless device is configured to program at least one of the tone and volume of the PCD when the wireless device is wirelessly communicated with the PCD.

13. The Personal Communication Device (PCD) of claim 9, further comprising a microphone tube and the speaker tube connected to the body middle portion, wherein the microphone tube and speaker tube are hollow, controllably flexible and extendable lengthwise, and wherein the microphone is electrically connected to the sound processing electronics via wires which are at least partially located within the microphone tube, and wherein the speaker is electrically connected to the sound processing electronics via wires which are at least partially located within the speaker tube.

14. The Personal Communication Device (PCD) of claim 9, further comprising a decorative jewelry cover, wherein at least one of wherein the body middle portion is configured to securely associate with a decorative jewelry cover, and the decorative jewelry cover is configured to securely associate with the body middle portion.

15. The Personal Communication Device (PCD) of claim 14, wherein the decorative jewelry cover is configured to engage with and cover the body middle portion.

16. The Personal Communication Device (PCD) of claim 9, wherein the PCD body includes a PCD cavity cover configurable between an open configuration and a closed configuration, and wherein the power source is located within the PCD body cavity and is at least one of a battery and a rechargeable cell.

17. The Personal Communication Device (PCD) of claim 9, wherein the PCD is configured such that when worn by the user, the speaker is located proximate the entrance to the user's ear canal.

* * * * *